| (12) | United States Patent<br>Chandivade et al. | (10) Patent No.: US 9,426,097 B1<br>(45) Date of Patent: Aug. 23, 2016 |
|---|---|---|

(54) FACILITATING COMMUNICATION BETWEEN DEVICES IN A NETWORK

(75) Inventors: Lalit Chandivade, Pune (IN); Shyam Sundar, Pune (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 1534 days.

(21) Appl. No.: 12/964,295

(22) Filed: Dec. 9, 2010

(51) Int. Cl.
*G06F 15/16* (2006.01)
*H04L 12/931* (2013.01)
*H04L 29/08* (2006.01)
*H04L 12/58* (2006.01)
*H04L 12/26* (2006.01)

(52) U.S. Cl.
CPC ............ *H04L 49/357* (2013.01); *H04L 12/585* (2013.01); *H04L 43/00* (2013.01); *H04L 51/12* (2013.01); *H04L 67/24* (2013.01); *H04L 12/2602* (2013.01)

(58) Field of Classification Search
CPC ..... H04L 67/24; H04L 12/585; H04L 49/357; H04L 51/12; H04L 43/00; H04L 12/2602
USPC ......................................................... 709/228
See application file for complete search history.

(56) References Cited

U.S. PATENT DOCUMENTS

| 7,103,504 B1* | 9/2006 | McGlaughlin ...... G06F 11/0709 702/182 |
|---|---|---|
| 2004/0024855 A1* | 2/2004 | Tsai .......................... H04L 12/24 709/223 |
| 2004/0210597 A1* | 10/2004 | Wanish .......................... 707/102 |
| 2005/0111378 A1* | 5/2005 | Chen et al. ..................... 370/252 |
| 2006/0072459 A1* | 4/2006 | Knight .................. G06F 13/385 370/235 |
| 2006/0171330 A1* | 8/2006 | Mandrell et al. .............. 370/254 |
| 2006/0265738 A1* | 11/2006 | Chrysanthakopoulos et al. ................................. 726/3 |
| 2007/0293275 A1* | 12/2007 | Kalinichenko et al. ........ 455/567 |
| 2007/0299958 A1* | 12/2007 | Hu ................................ 709/223 |
| 2008/0270553 A1* | 10/2008 | Mu ................................ 709/206 |
| 2009/0009343 A1* | 1/2009 | Boyer et al. ................ 340/573.1 |
| 2009/0106455 A1* | 4/2009 | Xu et al. ........................ 709/248 |
| 2009/0138566 A1* | 5/2009 | Ito et al. ........................ 709/206 |
| 2010/0154036 A1* | 6/2010 | McColgan et al. ............... 726/4 |
| 2011/0131191 A1* | 6/2011 | Szyperski et al. ............. 707/702 |
| 2012/0028614 A1* | 2/2012 | Bertin et al. ............... 455/412.2 |
| 2012/0039331 A1* | 2/2012 | Astigarraga et al. .......... 370/389 |

OTHER PUBLICATIONS

Roach, et al.; Session Initiation Protocol (SIP)—Specific Event Notification; Jun. 2002; Network Working Group, pp. 1-35.*
DeSanti, et al.; Fibre Channel Registered State Change Notification (RSCN) MIB; Aug. 14, 2006; Internet Draft; pp. 1-32.*
Kembel, et al.; Fibre Channel Switched Fabric; 2004; The Fibre Channel Consultant Series; pp. 1-16.*
DeSanti, et al.; Fibre Channel Registered State Change Notification (RSCN) MIB; Aug. 2007; Network Working Group; pp. 1-29.*

* cited by examiner

*Primary Examiner* — Oleg Survillo
(74) *Attorney, Agent, or Firm* — Klein, O'Neill & Singh, LLP

(57) ABSTRACT

Certain of the present embodiments provide a mechanism to enable ports of initiator devices in a network to receive notifications of port state change that relate only to ports of target devices in the network. Certain others of the present embodiments provide a mechanism to enable ports of initiator devices to determine whether a notification of port state change pertains to a port of an initiator device or a target device.

22 Claims, 5 Drawing Sheets

FACILITATING COMMUNICATION BETWEEN DEVICES IN A NETWORK

TECHNICAL FIELD

The present invention relates to computing systems.

BACKGROUND

A computer network, often referred to simply as a network, is a group of interconnected computing devices that facilitates communication among users and allows users to share resources. Adapters, switches and routers may be used to interconnect network devices. Computing devices in the network that initiate communication with storage devices, also referred to as targets, are called initiators. When an initiator device joins a network, it goes through a registration process. Continuous efforts are being made to improve the registration process.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One of the present embodiments comprises a machine-implemented method for facilitating communication between devices in a network. The network includes at least one initiator device and at least one switch. The method comprises a port of the initiator device logging into the switch. The method further comprises the initiator port sending a registration request to the switch indicating that the initiator port should receive notifications of state change in other devices in the network from the switch only when the state change occurs in ports of target devices. The method further comprises determining whether the switch accepted the initiator port's registration request. If the switch accepted the initiator port's registration request, the initiator port communicates with other devices in the network.

Another of the present embodiments comprises a machine-implemented method for facilitating communication between devices in a network. The network includes at least one node device and at least one switch. The method comprises a port of the node changing state. The method further comprises determining whether the port is associated with a target device. If the port is associated with a target device, the switch sends a notification of port state change to all ports in the network registered to receive notifications of state change in other devices in the network from the switch only when ports of target devices change state, and to all ports in the network registered to receive notifications of state change in other devices in the network from the switch when either ports of target devices or ports of other initiator devices change state. If the port is not associated with a target device, the switch sends a notification of port state change to all ports in the network registered to receive notifications of state change in other devices in the network from the switch when either a port of a target device or a port of another initiator device in the network changes state.

Another of the present embodiments comprises a machine-implemented method for facilitating communication between devices in a network. The network includes a plurality of node devices and at least one switch. The method comprises a first port of one of the nodes changing state. The method further comprises determining whether the first port is associated with an initiator device or a target device. If the first port is associated with an initiator device, the switch sends a notification of port state change to all ports in the network with an indication that the first port is associated with an initiator device. If the first port is associated with a target device, the switch sends a notification of port state change to all ports in the network with an indication that the first port is associated with a target device.

Another of the present embodiments comprises a switch. The switch comprises a memory for storing processor-executable instructions. The switch further comprises a processor for executing the instructions out of the memory. The switch further comprises a plurality of ports for enabling communication with devices in a network. The switch is configured to receive registration requests from ports of the devices when the device ports login to the switch. At least some of the registration requests indicate that the device ports should receive notifications of state change in other devices in the network from the switch only when ports of target devices change state.

Another of the present embodiments comprises a machine-implemented method for facilitating communication in a network. The method comprises a port of an initiator device logging into a network device. The initiator port sends a registration request to the network device indicating that the initiator port should receive notifications of state change in other devices in the network from the network device only when the state change occurs in ports of target devices. The method further comprises determining whether the network device accepted the initiator port's registration request. If the network device accepted the initiator port's registration request, the initiator port communicates with other devices in the network.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1:
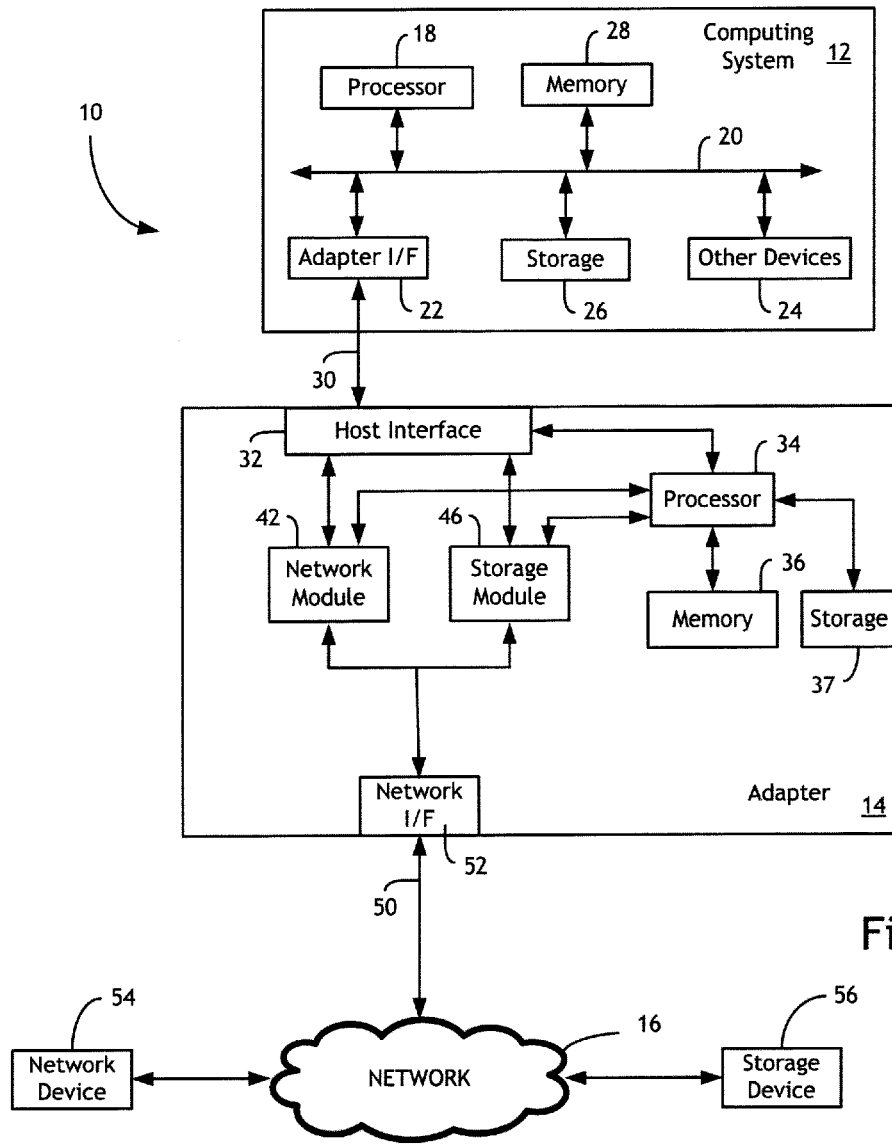
FIG. 1 is a functional block diagram of a computing system coupled to a network through an adapter.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

DEFINITIONS

The following definitions are provided as they are typically (but not exclusively) used in the networking environment, implementing the various adaptive aspects of the present invention.

Area—A second level in a three-level addressing scheme, for example, one that is provided by the Fibre Channel standards. An area identifier (Area_ID) may be used to identify one or more ports of a switch, or an Arbitrated Loop, for example, as defined by the Fibre Channel standards. The structure of Area_ID may be defined by a standard protocol, for example, the Area_ID field in a Fibre Channel frame header is defined by the middle 8-bits of a 24-bit address.

Domain—A set of interconnected network elements and addresses that are administered together and that may communicate. A domain may include one or more switches that have the same domain identifier value (Domain_ID) for ports within or attached to switches. The structure of the identifying domain may be defined by a standard protocol. For example, Domain_ID in a Fibre Channel frame header is defined by the upper 8-bits of a 24-bit address.

Fabric—A system that interconnects various ports attached to it and is capable of routing frames by using destination identifiers provided in frame headers.

N_Port—As defined by the Fibre Channel standards, a port a connects a network node to a fabric or to another node.

Name Server—A service that maintains a data structure. The data structure maintained by the name server may be called a "Name Server Database."

Port—In a generic sense, a module that includes logic and circuitry for handling incoming and outgoing traffic. A port can be a part of a switch, an adapter or other devices.

Port_ID—An identifier for identifying a port. The structure of the identifier may be defined by a standard. For example, the Port_ID in a Fibre Channel frame header is defined by the lower 8-bits of a 24-bit frame address.

Service—A switch or any other network device may provide various services, for example, maintaining a "Name Server" database. The processor executable code providing a particular service typically maintains an object that can be accessed by an address.

FIG. 1 is a block diagram of a system 10 configured for use with the present embodiments. The system 10 may includes one or more computing system 12 (may also be referred to as "host system 12") coupled to an adapter 14 that interfaces with a network 16. The network 16 may include, for example, additional computing systems, servers, storage systems, etc. The computing system 12 may include one or more processors 18, also known as a central processing unit (CPU). The processor 18 executes computer-executable process steps and interfaces with a computer bus 20. An adapter interface 22 facilitates the ability of the computing system 12 to interface with the adapter 14, as described below. The computing system 12 also includes other devices and interfaces 24, which may include a display device interface, a keyboard interface, a pointing device interface, etc.

The computing system 12 may further include a storage device 26, which may be for example a hard disk, a CD-ROM, a non-volatile memory device (flash or memory stick) or any other device. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 also interfaces to the computer bus 20 to provide the processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1, a link 30 and the adapter interface 22 couple the adapter 14 to the computing system 12. The adapter 14 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 14 shown in FIG. 1 may be configured to operate as an FCOE adapter and may be referred to as FCOE adapter 14. QLogic Corporation, the assignee of the present application, provides one such adapter. The illustrated adapter 14, however, does not limit the scope of the present embodiments. The present embodiments may be practiced with adapters having different configurations.

The adapter 14 interfaces with the computing system 12 via the link 30 and a host interface 32. In one embodiment, the host interface 32 may be a PCI Express interface coupled to a PCI Express link. The adapter 14 may also include a processor 34 that executes firmware instructions out of memory 36 to control overall adapter 14 operations.

The adapter 14 may also include a processor 34 that executes firmware instructions out of memory 36 to control overall adapter operations. The adapter 14 may also include storage 37, which may be for example non-volatile memory, such as flash memory, or any other device. The storage 37 may store executable instructions and operating parameters that can be used for controlling adapter operations.

The adapter 14 includes a network module 42 for handling network traffic via a link 50. In one embodiment, the network interface 42 includes logic and circuitry for handling network packets, for example, Ethernet or any other type of network packets. The network module 42 may include memory buffers (not shown) to temporarily store information received from other network devices 54 and transmitted to other network devices 54.

The adapter 14 may also include a storage module 46 for handling storage traffic to and from storage devices 56. The storage interface 44 may further include memory buffers (not shown) to temporarily store information received from the storage devices 56 and transmitted by the adapter 14 to the storage devices 56. In one embodiment, the storage module 46 is configured to process storage traffic according to the Fibre Channel storage protocol, or any other protocol.

The adapter 14 also includes a network interface 52 that interfaces with a link 50 via one or more ports (not shown). The network interface 52 includes logic and circuitry to receive information via the link 52 and pass it to either the network module 42 or the storage module 46.

Figure 2:
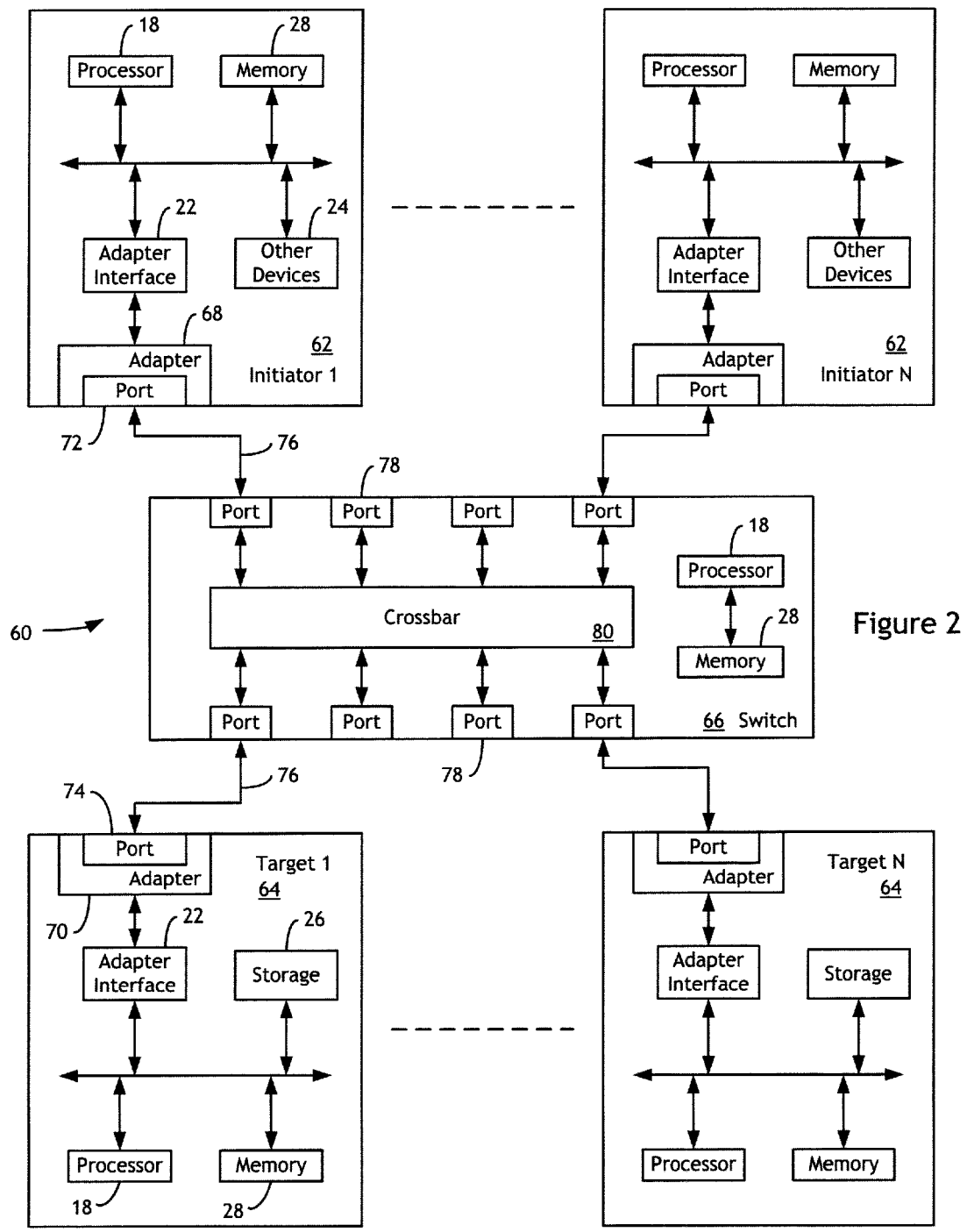
FIG. 2 is a functional block diagram of a network, including a plurality of initiator devices, a plurality of target devices, and a switch.

FIG. 2 is a block diagram of a network 60 configured for use with the present embodiments. The network 60 includes a plurality of initiator devices 62 and a plurality of target devices 64 connected through a switch 66 or any other network device. N initiator devices 62 and N target devices 64 are shown, where N may be any number. The initiators 62 and targets 64 may be connected through more than one switch 66 or any other network device. However, for simplicity only one switch 66 is shown. Further, the network 60 may contain additional devices. The network 60 may also be connected, via one or more routers (not shown), to at least one other network 60.

In certain embodiments, the initiator devices 62 are host computing systems similar to those illustrated in FIG. 1, and the target devices 64 are remote data storage devices (such as disk arrays and tape libraries). The initiator devices 62 include at least one processor 18, a memory 28, an adapter interface 22, and other devices 24. The other devices 24 may include storage (not shown). The target devices 64 include at least one processor 18, a memory 28, an adapter interface 22, and storage 26. These components are described above with respect to FIG. 1.

Each initiator device 62 and each target device 64 also includes an adapter 68, 70 having one or more ports 72, 74. Each port 72, 74 is capable of handling both transmission and receipt of information, and may include transmit buffers and receive buffers (not shown). A buffer is a region of memory used to temporarily hold data while it is being moved from one place to another. The initiator devices 62 and target devices 64 are connected through their ports 72, 74, over a link 76, to the switch 66. In a Fibre Channel (FC) environment, each port 72, 74 may be, for example, an F_Port, an FL_Port or an E-Port. F_Ports, FL_Ports an E-Ports are described in the FC specification. However, the present embodiments are not limited to FC, or any other protocol.

The switch 66 includes at least one processor 18, a memory 28, and a plurality of ports 78. Eight ports 78 are shown, but the switch 66 could have any number of ports 78. Each port 78 is capable of handling both transmission and receipt of information, and may include transmit buffers and receive buffers (not shown). Each port 78 has transmit and receive connections to a switch crossbar 80. The crossbar 80 connects the switch ports 78 to one another in a matrix configuration so that information entering the switch 66 through a first one of the ports 78 may exit the switch 66 through any of the other ports 78. The switch crossbar 80 may include a plurality of switch crossbars 80 for handling specific types of data and data flow control information. For illustration purposes only, the switch crossbar 80 is shown as a single crossbar 80. The switch crossbar 80 may be a connectionless crossbar (packet switched) of known conventional design.

As described above, when a port 72 of an initiator device 62 joins a network 60, it logs into a switch's controller to notify the switch 66 that it has joined the network 60. As part of this registration process, the initiator port 72 provides a request to the switch controller to add the initiator port 72 to the list of network devices that are to be notified when other ports 72, 74 in the network 60 change state. Then, the initiator port 72 receives a notification every time a target port 74 or an initiator port 72 in the network 60 changes state. A state change may occur, for example, when a port 72, 74 joins or leaves the network 60.

The foregoing system is inefficient, because in most cases initiator ports 72 don't need to know when other initiator ports 72 change state, since initiator ports 72 don't generally communicate with other initiator ports 72. Certain of the present embodiments address this problem by providing a mechanism through which initiator ports 72 receive notifications only when target ports 74 in the network 60 change state. When an initiator port 72 in the network 60 changes state, other initiator ports 72 are not notified. Certain others of the present embodiments address this problem by providing a mechanism through which initiator ports 72 can identify whether a received notification pertains to an initiator port 72 or a target port 74.

Figure 3:
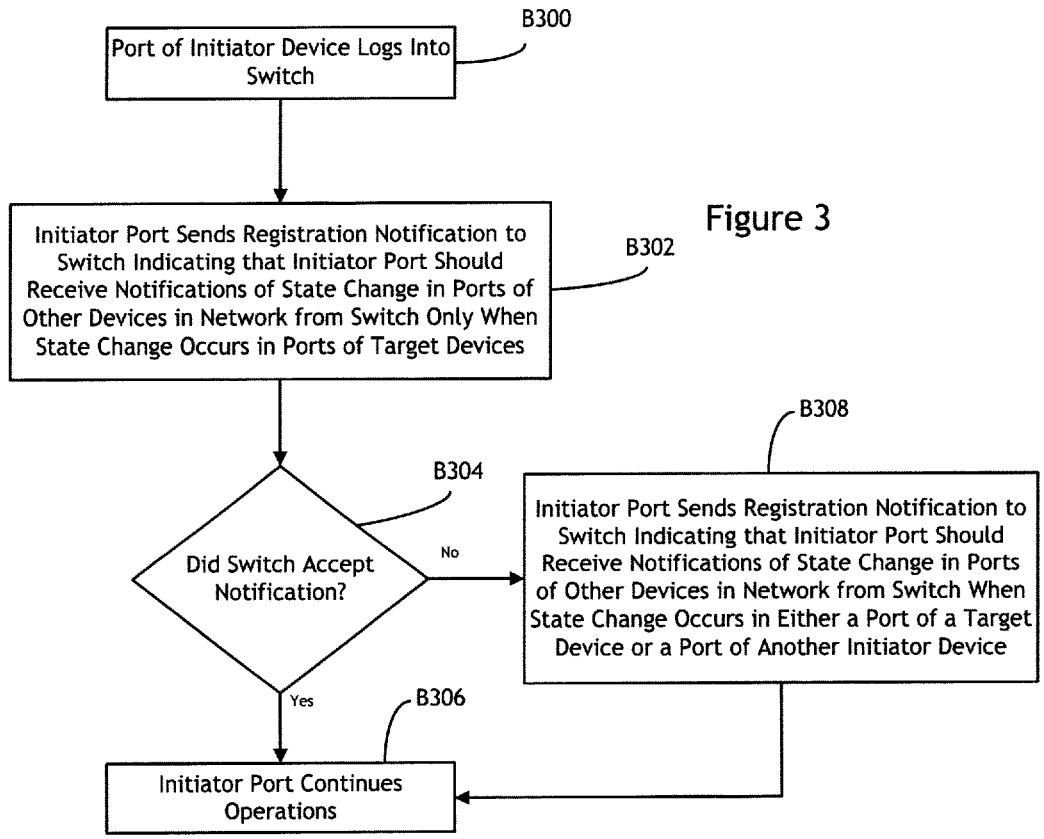
FIGS. 3-8 are flowcharts illustrating various embodiments of methods for facilitating communication between devices in a network.

FIG. 3 is a flowchart illustrating one of the present embodiments for facilitating communication between devices in a network 60. In particular, FIG. 3 illustrates a process for an initiator port 72 logging into a switch 66 or a similar network device. At block B300, a port 72 of an initiator device 62 logs into a switch 66. As part of the login process, at block B302 the initiator port 72 sends a registration request to the switch 66. The registration request indicates that the initiator port 72 should receive notifications of state change in ports 72, 74 of other devices in the network 60 from the switch 66 only when ports 73 of target devices 64 change state. The process then advances to block B304, where a determination is made as to whether the switch 66 accepted the registration request from the initiator port 72. This block checks for device compatibility, as described further below. If the answer is yes, then the initiator port 72 continues operations, as indicated at block B306. However, if the answer is no, then the initiator port 72 sends another registration request to the switch 66. The second registration request indicates that initiator port 72 should receive notifications of state change in other devices in the network 60 from the switch 66 when either a port 74 of a target device 64 or a port 72 of another initiator device 62 changes state. After block B308, the process advances to block B306 where the initiator port 72 continues operations.

As indicated above, the determination made at block B304 checks for device compatibility. Network devices operate according to a communication protocol, and communication protocols are constantly evolving. Thus, an older switch 66 might not recognize the registration request sent in block B302, because the switch 66 might operate according to an earlier version of a communication protocol. In such a situation, the initiator device 62 and the switch 66 would not be compatible if the initiator device 62 were operating according to a newer version of the protocol that the switch 66 does not support. When the initiator port 72 encounters such a switch 66, it sends the registration request of block B308 to the switch 66 so that the initiator device 62 can operate under the older protocol.

The determination made at block B304 could be based on whether the initiator port 72 receives an acknowledgement from the switch 66 prior to a timeout. For example, after sending the registration request the initiator port 72 may wait for a predetermined interval. If the initiator port 72 does not receive an acknowledgement within the interval, the initiator port 72 assumes that the switch 66 has not accepted the registration request, and the process proceeds to block B308.

Figure 4:
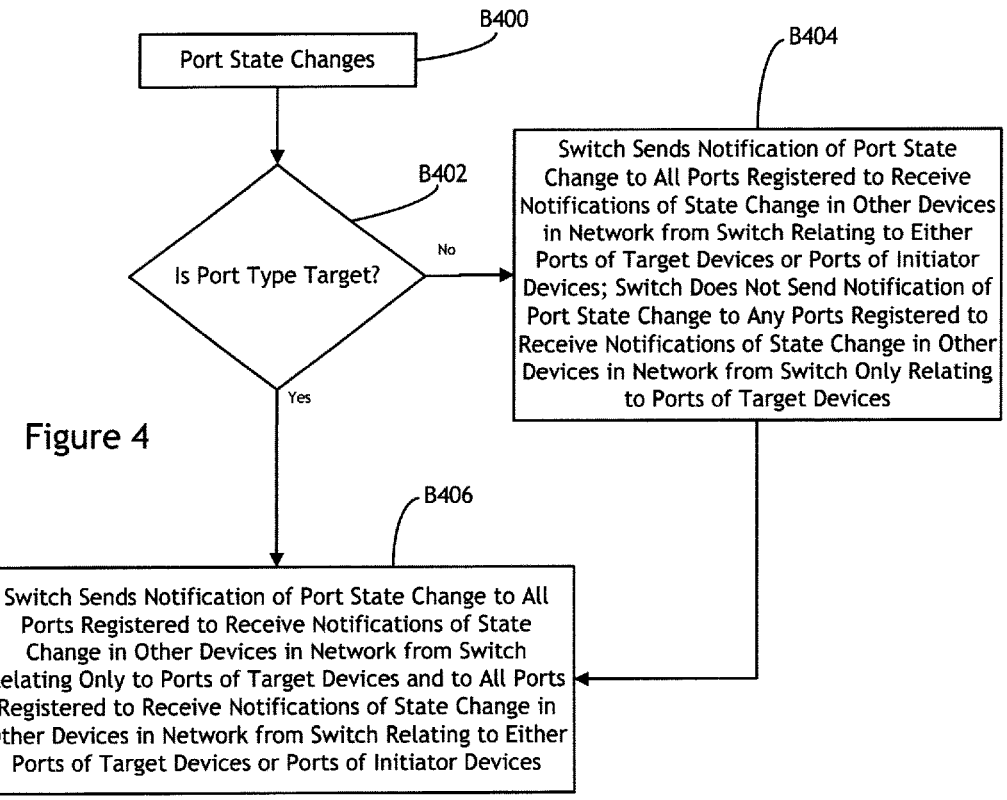

FIG. 4 is a flowchart illustrating another of the present embodiments for facilitating communication between devices in a network 60. In particular, FIG. 4 illustrates a process for notifying initiator ports 72 in a network 60 that another port 72, 74 has changed state. At block B400, the state of a port 72, 74 changes. The state change may be, for example, due to the port 72, 74 joining or leaving the network 60. At block B402, a determination is made as to whether the port 72, 74 that changed state was a port 74 of a target device 64. In certain embodiments, during the process of logging into the switch 66 each port 72, 74 indicates to the switch 66 whether it is a port 72 of an initiator device 62 or a port 74 of a target device 64. The switch 66 retains this information in switch memory so that when a port 72, 74 undergoes a state change the switch 66 will know whether the port 72, 74 that changed state is an initiator port 72 or a target port 74.

If, at block B402, it is determined that the port that changed state was not a port 72 of a target device 64, then the process advances to block B404. There, the switch 66 sends a notification of port state change to all initiator ports 72 in the network 60 that are registered to receive notifications of state change from the switch 66 when either ports 74 of target devices 64 or ports 72 of initiator devices 62 change state. At block B404, the switch 66 does not send a notification of port state change to any initiator ports 72 in the network 60 that are registered to receive notifications of state change from the switch 66 only when ports 74 of target devices 64 change state. Thus, the process of FIG. 4 creates efficiency by avoiding sending notifications of port state change to initiator devices 62 when other initiator devices 62 change state.

However, if at block B402 it is determined that the port that changed state was a port 74 of a target device 64, then the process advances to block B406. There, the switch 66 sends a notification of port state change to all initiator ports 72 in the network 60 that are registered to receive notifications of state change from the switch 66 only when ports 74 of target devices 64 change state. Further, the switch 66 sends a notification of port state change to all initiator ports 72 in the network 60 that are registered to receive notifications of state change from the switch 66 when either ports 74 of target devices 64 or ports 72 of initiator devices 62 change state.

Figure 5:
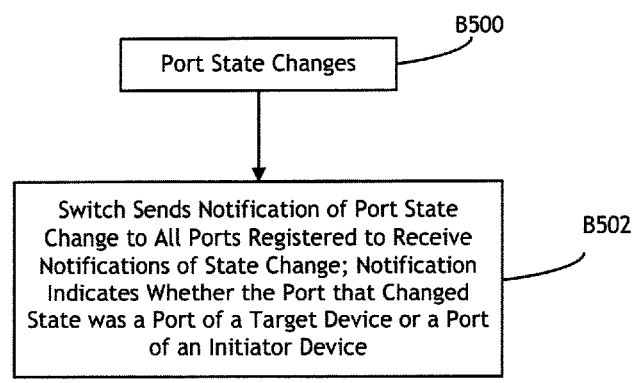

FIG. 5 is a flowchart illustrating another of the present embodiments for facilitating communication between devices in a network 60. In particular, FIG. 5 illustrates a process for notifying initiator ports 72 in a network 60 that another port 72, 74 in the network 60 has changed state. At block B500, the state of a port 72, 74 changes. The state change may be, for example, due to the port 72, 74 joining or leaving the network 60. At block B502, the switch 66 sends a notification of port state change to all initiator ports 72 in the network 60 that are registered to receive notifications of state change. The notification indicates whether the port that changed state was a port 74 of a target device 64 or a port 72 of an initiator device 62.

The foregoing embodiments advantageously make communications between devices in a network 60 more efficient. Again, initiator devices 62 generally do not communicate with other initiator devices 62. Thus, it is disruptive for initiator devices 62 to receive notifications of port state change that relate to other initiator devices 62, because such notifications precipitate device rediscovery that temporarily halts communication between devices. Certain of the present embodiments solve this problem by avoiding sending notifications of port state change to initiator devices 62 when other initiator devices 62 change state. Certain others of the present embodiments solve this problem by indicating in state change notifications whether the port 70 that changed state was a target port 74 or an initiator port 72. Thus, when an initiator port 72 receives a state change notification that relates to another initiator port 72, the initiator port 72 can simply disregard the notification and thereby avoid device rediscovery.

In certain embodiments a management console (not shown, but may be similar to the computing system 12) that executes a processor-executable management application (not shown) may be used to configure the initiator devices 62 and the switch 60. For example, the management application may set parameters in an adapter of each initiator device 62 to determine which type of registration request to send to the switch 60.

The present embodiments are not limited to any communications protocol. However, the following example further illustrates the present embodiments by showing how the present embodiments may be applied in a Fibre Channel (FC) network. In an FC network, when a port of an initiator device joins the network, it logs into a switch to notify the switch that it has joined the network. As part of this registration process, the initiator port sends a State Change Registration (SCR) to the switch. The SCR provides a request to the switch controller to add the initiator port to the list of network devices that are to be notified when other ports in the network change state. A state change may be, for example, due to a port joining or leaving the network.

According to the FC specification, an SCR does not include a provision for limiting the notifications that the initiator port will receive. Thus, whenever a target port or an initiator port changes state, every initiator port in the network receives a notification. The notification is a Registered State Change Notification (RSCN). An RSCN does not include a provision for indicating what type of port has changed state. Initiator ports thus have to rediscover target ports whenever they receive an RSCN in order to determine whether the port that changed state was an initiator or a target. If the RSCN provided an address for the port that changed state, the initiator port will send a notification to the identified port only. However, if the RSCN was a global notification, the initiator port sends notifications to all ports in the network. The present embodiments solve this problem by including a provision for limiting the notifications that the initiator port receives.

The following chart illustrates the available SCRs according to the current FC specification:

| SCR Value | Function |
|---|---|
| 0 | Reserved |
| 1 | Fabric Detected registration - Register to receive all RSCN Requests issued by the Fabric Controller for events detected by the Fabric |
| 2 | N_Port Detected registration - Register to receive all RSCN Requests issued by the Fabric Controller for events detected by the Affected N_Port or NL_Port |
| 3 | Full registration - Register to receive all RSCN Requests issued by the Fabric Controller. The RSCN request shall return all Affected N_Port ID pages. |
| 4 | Fabric Name Change registration - Register to receive Fabric Name Change RSCNs. |
| 5-254 | Reserved |
| 255 | Clear registration - Remove any current RSCN registrations |

The present embodiments propose to add a new SCR: Target registration—Register to receive only those RSCN Requests issued by the Fabric Controller that relate to Target ports. The new SCR may have any Value, for example SCR Value 5. After the switch acknowledges receipt of the SCR having Value 5 from the initiator port, the initiator port will receive only those RSCNs that pertain to changes of state in target ports. The initiator port will not receive any RSCNs that pertain to changes of state in other initiator ports. The SCR Value 5 thus creates the same efficiencies described above with respect to the protocol-agnostic embodiments.

Figure 6:
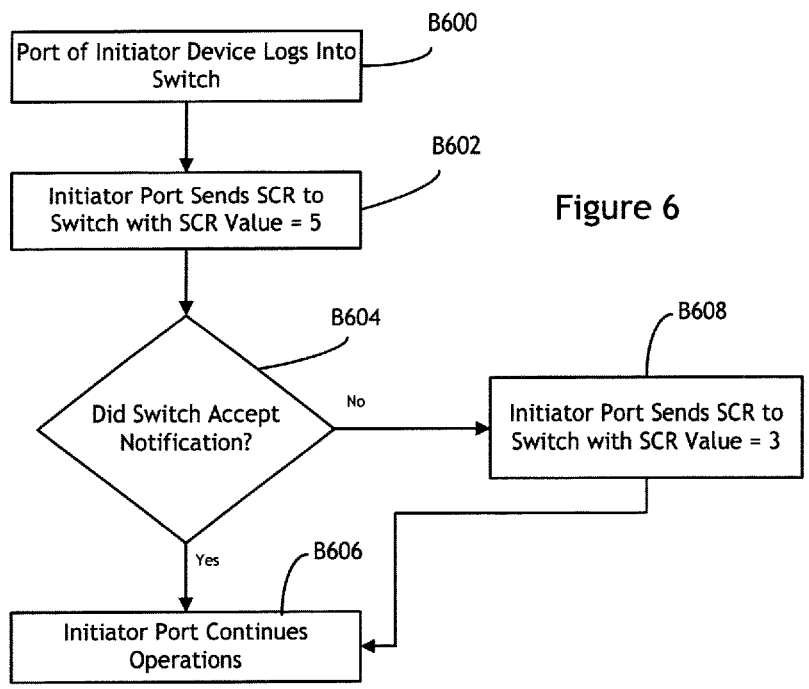

FIG. 6 is a flowchart illustrating another of the present embodiments for facilitating communication between devices in a network. In particular, FIG. 6 illustrates a process for an FC initiator port logging into an FC switch. At block B600, a port of an FC initiator device logs into an FC switch. As part of the login process, at block B602 the initiator port sends an SCR to the switch. The SCR has Value 5, which indicates that the initiator port should receive RSCNs relating only to state changes in ports of target devices. The process then advances to block B604, where a determination is made as to whether the switch accepted the SCR from the initiator port. This block checks for device compatibility, as described above with respect to FIG. 3. If the answer is yes, then the initiator port continues operations, as indicated at block B606. However, if the answer is no, then the initiator port sends another SCR to the switch. The SCR has Value 3, which indicates that initiator port should receive RSCNs relating to state changes in both ports of initiator devices and ports of target devices. After block B608, the process advances to block B606 where the initiator port continues operations.

Figure 7:
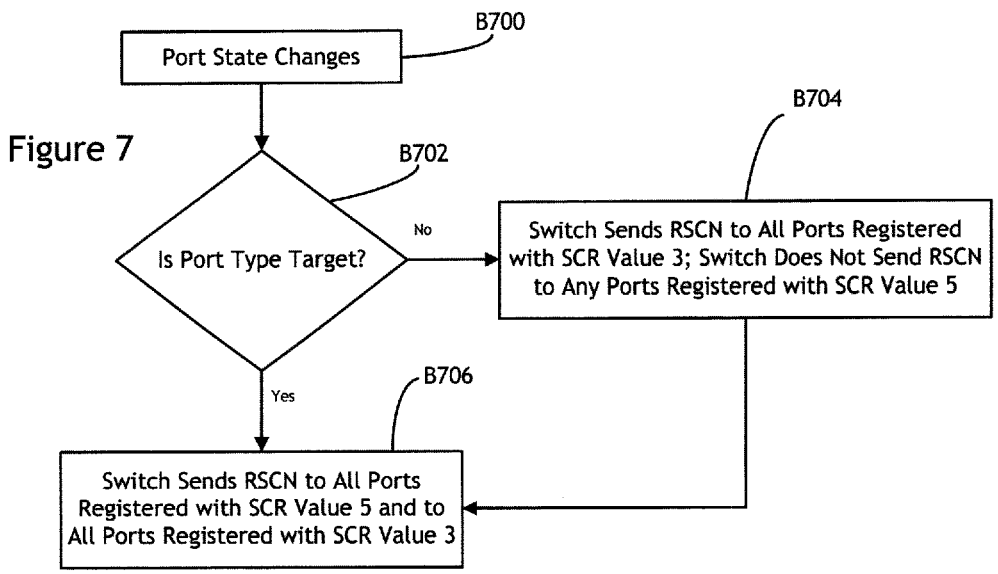

FIG. 7 is a flowchart illustrating another of the present embodiments for facilitating communication between devices in an FC network. In particular, FIG. 7 illustrates a process for notifying ports in an FC network that another port has changed state. At block B700, the state of a port changes. The state change may be, for example, due to the port joining or leaving the FC network. At block B702, a determination is made as to whether the port that changed state was a port of a target device. Again, this determination may be made according to information retained in the switch that is provided by each port when it logs into the switch.

If, at block B702, it is determined that the port that changed state was not a port of a target device, then the process advances to block B704. There, the switch sends an RSCN to all ports in the network that are registered with SCR Value 3. At block B704, the switch does not send an RSCN to any ports in the network that are registered with SCR Value 5. Thus, the process of FIG. 7 creates efficiency by avoiding sending RSCNs to initiator devices when other initiator devices change state.

However, if at block B702 it is determined that the port that changed state was a port of a target device, then the process advances to block B706. There, the switch sends an RSCN to all ports in the network that are registered with SCR Value 5. Further, the switch sends an RSCN to all ports in the network that are registered with SCR Value 3.

As indicated above, FC RSCNs do not include a provision for indicating what type of port has changed state. The RSCN contains three main parts: RSCN Event Qualifier, Address Format, and Port_ID. According to the FC specification (Fibre Channel Link Services (FC-LS) Rev. 1.51), the current Event Qualifiers are:

CHANGED NAME SERVER OBJECT—An object maintained by the Name Server has changed state for the port, area or domain indicated by the affected Port_ID.

CHANGED PORT ATTRIBUTE—An internal state of the port specified by the affected Port_ID has changed. The change of state is identified in a protocol-specific manner.

CHANGED SERVICE OBJECT—An object maintained by the service identified by the well-known address contained in affected Port_ID has changed state. This Event Qualifier value shall not be used by services accessed through N_Port_ID that are not well-known addresses.

CHANGED SWITCH CONFIGURATION—Switch configuration has changed for the area or domain specified by the affected Port_ID.

REMOVED OBJECT—The port, area or domain indicated by the affected Port_ID is no longer accessible on the Fabric.

The present embodiments propose to define new RSCN Event Qualifiers that identify the type of port to which the Event Qualifier applies. For example, two new RSCN Event Qualifiers may be:

CHANGED INITIATOR PORT ATTRIBUTE—An internal state of the initiator port specified by the affected Port_ID has changed. The change of state is identified in a protocol specific manner.

CHANGED TARGET PORT ATTRIBUTE—An internal state of the target port specified by the affected Port_ID has changed. The change of state is identified in a protocol specific manner.

These new Event Qualifiers not only indicate that a port has changed an attribute, they also identify that port as an initiator port or a target port. When an initiator device receives an RSCN with the Event Qualifier CHANGED TARGET PORT ATTRIBUTE, the initiator device can take appropriate steps to adjust to the changed attribute at the target port. However, when an initiator device receives an RSCN with the Event Qualifier CHANGED INITIATOR PORT ATTRIBUTE, the initiator device can simply ignore the RSCN, since initiator devices generally do not communicate with other initiator devices.

Other examples of new RSCN Event Qualifiers include:

CHANGED INITIATOR NAME SERVER OBJECT—An object maintained by the Name Server has changed state for the initiator port, area or domain indicated by the affected initiator port_ID.

CHANGED TARGET NAME SERVER OBJECT—An object maintained by the Name Server has changed state for the target port, area or domain indicated by the affected target port_ID.

CHANGED INITIATOR SERVICE OBJECT—An object maintained by the service identified by the well-known address contained in affected initiator port_ID has changed state. This Event Qualifier value shall not be used by services accessed through N_Port_ID that are not well-known addresses.

CHANGED TARGET SERVICE OBJECT—An object maintained by the service identified by the well-known address contained in affected target port_ID has changed state. This Event Qualifier value shall not be used by services accessed through N_Port_ID that are not well-known addresses.

CHANGED INITIATOR SWITCH CONFIGURATION—Switch configuration has changed for the area or domain specified by the affected initiator port_ID.

CHANGED TARGET SWITCH CONFIGURATION—Switch configuration has changed for the area or domain specified by the affected target port_ID.

REMOVED INITIATOR OBJECT—The initiator port, area or domain indicated by the affected initiator port_ID is no longer accessible on the Fabric.

REMOVED TARGET OBJECT—The target port, area or domain indicated by the affected target port_ID is no longer accessible on the Fabric.

Figure 8:
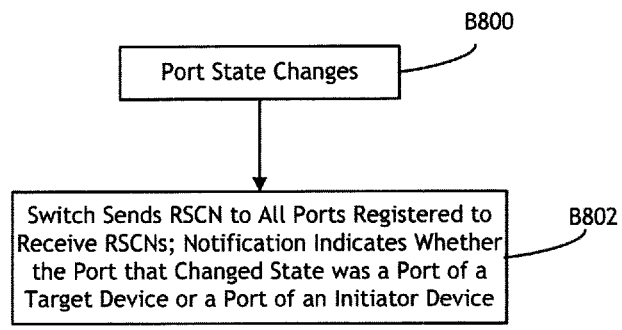

FIG. 8 is a flowchart illustrating another of the present embodiments for facilitating communication between devices in a network. In particular, FIG. 8 illustrates a process for notifying ports in an FC network that another port in the network has changed state. At block B800, the state of an FC port changes. The state change may be, for example, due to the port joining or leaving the FC network. At block B802, the switch sends an RSCN to all ports in the network that are registered to receive notifications of state change. The RSCN indicates whether the port that changed state was a port of a target device or a port of an initiator device.

The foregoing embodiments provide the same advantages as described above with respect to the protocol-agnostic embodiments of FIGS. 3-5. Further, although the foregoing examples of the various embodiments have been shown with respect to a switch, the present embodiments may be implemented in any network device that manages the port registration process.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine-implemented method for facilitating communication in a network, the method comprising:
    an initiator port of an initiator device logging into a network device to communicate with a target device having a target port, the network device configured for receiving an input/output request from the initiator port and for reading and writing data at the target device accessible via the target port;
    the initiator port sending a registration request complying with a modified state change request protocol to the network device indicating that the initiator port should selectively receive notifications of state change in other devices in the network from the network device only when a state change occurs in ports of target devices in the network;
    determining whether an acknowledgement is received from the network device indicating that the network device accepted the registration request; and
    if it is determined that the network device accepted the registration request complying with the modified state change request protocol for selectively notifying the initiator port of state change notification, the initiator port of the initiator device configured to receive state change notification only when a port in one of the target devices changes its state; and
    if no acknowledgement is received from the network device within a predetermined time interval, the initiator port sending a different registration request to the network device complying with a standard state change request protocol and indicating that the initiator port should receive notifications of state change in other devices in the network from the network device when any of a port of a target device changes state or a port of another initiator device changes state.

2. The method of claim 1, wherein the network device is a switch.

3. The method of claim 1, further comprising the port of the target device changing state.

4. The method of claim 3, further comprising the initiator port receiving a state change notification from the network device indicating that the target port of the target device changed state.

5. The method of claim 1, further comprising a port of a non-target device changing state.

6. The method of claim 5, further comprising the initiator port receiving no state change notification from the network device regarding the state change of the port of the non-target device when the network device accepted the registration request.

7. The method of claim 1, wherein the network is a Fibre Channel network.

8. The method of claim 7, wherein the registration request comprises a State Change Registration (SCR).

9. A machine-implemented method for facilitating communication between devices in a network, the network including at least one initiator device and a switch, the method comprising:
- an initiator port of the initiator device logging into the switch to communicate with a target device having a target port, the switch configured for receiving an input/output request from the initiator port and for reading and writing data at the target device accessible via the target port;
- the initiator port sending a registration request complying with a modified state change request protocol to the switch indicating that the initiator port should selectively receive notifications from the switch only when a state change occurs at the target port of the target device or other target ports of other target devices in the network;
- determining whether an acknowledgement is received from the switch indicating that the switch accepted the registration request;
- when it is determined that the switch accepted the registration request complying with the modified state change request protocol for selectively notifying the initiator port of state change notification, the initiator port of the initiator device configured to receive state change notification only when the target port or the other target ports change its state; and
- when no acknowledgement is received from the switch within a predetermined time interval, then sending a different registration request by the initiator port complying with a standard state change request protocol seeking notification when the target port of the target device, other target ports of other target devices or any initiator port of another initiator device changes its state.

10. The method of claim 9, further comprising the target port of the target device changing state.

11. The method of claim 10, further comprising the initiator port receiving a state change notification from the switch indicating that the target port of the target device changed state.

12. The method of claim 9, further comprising a port of a non-target device changing state.

13. The method of claim 12, further comprising the initiator port receiving no state change notification from the switch regarding the state change of the port of the non-target device when the switch accepted the registration request.

14. The method of claim 9, wherein the network is a Fibre Channel network.

15. The method of claim 14, wherein the initiator port and the target port are Fibre Channel ports.

16. A non-transitory, machine readable storage medium storing executable instructions, which when executed by a machine, causes the machine to perform a method for facilitating communication between devices in a network, the network including at least one initiator device and a switch, the method comprising:
- an initiator port of the initiator device logging into the switch to communicate with a target device having a target port, the switch configured for receiving an input/output request from the initiator port and for reading and writing data at the target device accessible via the target port;
- the initiator port sending a registration request complying with a modified state change request protocol to the switch indicating that the initiator port should selectively receive notifications from the switch only when a state change occurs at the target port of the target device or other target ports of other target devices in the network;
- determining whether an acknowledgement is received from the switch indicating that the switch accepted the registration request;
- when it is determined that the switch accepted the registration request complying with the modified state change request protocol for selectively notifying the initiator port of state change notification, the initiator port of the initiator device configured to receive state change notification only when the target port or the other target ports change its state; and
- when no acknowledgement is received from the switch within a predetermined time interval, then sending a different registration request by the initiator port complying with a standard state change request protocol seeking notification when the target port of the target device, other target ports of other target devices or any initiator port of another initiator device changes its state.

17. The storage medium of claim 16, further comprising: the port of the target device changing state.

18. The storage medium of claim 17, further comprising: the initiator port receiving a state change notification from the switch indicating that the target port of the target device changed state.

19. The storage medium of claim 16, further comprising: a port of a non-target device changing state.

20. The storage medium of claim 19, further comprising: the initiator port receiving no state change notification from the switch regarding the state change of the port of the non-target device when the switch accepted the registration request.

21. The storage medium of claim 16, wherein the network is a Fibre Channel network.

22. The storage medium of claim 21, wherein the initiator port and the target port are Fibre Channel ports.

* * * * *